United States Patent
Zheng et al.

(10) Patent No.: US 12,204,741 B2
(45) Date of Patent: Jan. 21, 2025

(54) SCREENSHOT METHOD AND RELATED DEVICE

(71) Applicant: Huawei Technologies Co., Ltd., Shenzhen (CN)

(72) Inventors: Tao Zheng, Wuhan (CN); Hong Xiang, Shenzhen (CN); Junyong Zhang, Dongguan (CN); Jicun Fan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/848,915

(22) Filed: Jun. 24, 2022

(65) Prior Publication Data
US 2022/0317841 A1    Oct. 6, 2022

Related U.S. Application Data

(63) Continuation of application No. PCT/CN2020/136387, filed on Dec. 15, 2020.

(30) Foreign Application Priority Data

Dec. 27, 2019 (CN) .......................... 201911403704.2

(51) Int. Cl.
*G06F 3/048*       (2013.01)
*G06F 3/0482*      (2013.01)
*G06F 3/0484*      (2022.01)
*G06F 3/04883*     (2022.01)
*G06F 3/0354*      (2013.01)
*G06F 3/038*       (2013.01)
*G06F 3/044*       (2006.01)

(52) U.S. Cl.
CPC ............ *G06F 3/0484* (2013.01); *G06F 3/048* (2013.01); *G06F 3/0482* (2013.01); *G06F 3/04883* (2013.01); *G06F 3/03545* (2013.01); *G06F 3/0383* (2013.01); *G06F 3/0442* (2019.05); *G06F 3/0446* (2019.05); *G06F 2203/04808* (2013.01)

(58) Field of Classification Search
None
See application file for complete search history.

(56) References Cited

U.S. PATENT DOCUMENTS

| 10,299,110 B2 | 5/2019 | Ko et al. |
| 2004/0257346 A1 | 12/2004 | Ong et al. |
| 2012/0159385 A1 | 6/2012 | Duncan et al. |

(Continued)

FOREIGN PATENT DOCUMENTS

| CN | 102819352 A | * 12/2012 | ......... G06F 3/04883 |
| CN | 102968274 A | 3/2013 | |

(Continued)

*Primary Examiner* — Xuyang Xia
(74) *Attorney, Agent, or Firm* — Conley Rose, P.C.

(57) ABSTRACT

A screenshot method includes that a terminal responds to a non-stylus operation by entering a screenshot waiting state. When the terminal establishes a connection to the stylus, the terminal detects an operation of the stylus on a touchscreen of the terminal. If an operation of drawing a closed figure with the stylus is detected, the terminal takes a screenshot of interface content in the closed figure drawn with the stylus.

20 Claims, 11 Drawing Sheets

(56) References Cited

U.S. PATENT DOCUMENTS

| | | | |
|---|---|---|---|
| 2013/0019193 A1* | 1/2013 | Rhee | G06F 3/04886 |
| | | | 715/764 |
| 2013/0106760 A1* | 5/2013 | Pedersen | G06F 3/04162 |
| | | | 345/174 |
| 2014/0040826 A1* | 2/2014 | Wei | G06F 3/0488 |
| | | | 715/810 |
| 2014/0055398 A1* | 2/2014 | Myung | G06F 3/041 |
| | | | 345/173 |
| 2015/0253877 A1 | 9/2015 | Roper et al. | |
| 2018/0120963 A1* | 5/2018 | Hara | G06F 3/041 |
| 2019/0079663 A1 | 3/2019 | Wang et al. | |
| 2019/0102003 A1* | 4/2019 | Gur | G06F 3/041661 |
| 2019/0324635 A1* | 10/2019 | Fu | G06F 3/04883 |
| 2019/0379838 A1* | 12/2019 | Wang | G06T 7/13 |
| 2020/0363941 A1* | 11/2020 | Hao | G06F 3/0482 |

FOREIGN PATENT DOCUMENTS

| | | | | | |
|---|---|---|---|---|---|
| CN | 103699243 | A | | 4/2014 | |
| CN | 103942001 | A | | 7/2014 | |
| CN | 104571732 | A | * | 4/2015 | ......... G06F 3/03545 |
| CN | 105278825 | A | | 1/2016 | |
| CN | 106485166 | A | | 3/2017 | |
| CN | 108205412 | A | | 6/2018 | |
| CN | 108108117 | B | | 1/2021 | |
| WO | 2017121239 | A1 | | 7/2017 | |

* cited by examiner

SCREENSHOT METHOD AND RELATED DEVICE

CROSS-REFERENCE TO RELATED APPLICATIONS

This is a continuation of International Patent Application No. PCT/CN2020/136387 filed on Dec. 15, 2020, which claims priority to Chinese Patent Application No. 201911403704.2 filed on Dec. 27, 2019. The disclosures of the aforementioned applications are hereby incorporated by reference in their entireties.

TECHNICAL FIELD

This application relates to the field of computer technologies, and in particular, to a screenshot method and a related device.

BACKGROUND

Tablets, mobile phones, computers, and the like all provide some quick screenshot (or screen capture or screen copying) operation methods. For example, on a computer running a WINDOWS operating system, a screenshot button (print scan) may be pressed to take a screenshot. For another example, on a mobile phone running an ANDROID operating system, volume and power buttons may be pressed at the same time to take a screenshot. With development of computer technologies, it is more convenient to take a screenshot. For example, some mobile phones provide a function of taking a screenshot by double-tapping with a knuckle. FIG. 1A shows a corresponding scenario, and implementation logic in the scenario is shown in FIG. 1B. A double-tap with a knuckle is determined mainly based on information in two aspects. On one hand, a touch action and a touch area are determined by using a touchscreen (touch panel), to determine whether a touch is performed with a knuckle. On the other hand, a double-tap operation is determined by using an inertial measurement unit (IMU), to determine whether there is a double-tap operation. If both conditions are met, a screenshot event is started.

However, many mobile phones provide styluses. When there is a stylus, if a screenshot is still taken by double-tapping with a knuckle, smoothness and efficiency of an operation are inevitably affected. Therefore, how to take a screenshot when there is a stylus is a technical problem that is being studied by a person skilled in the art.

SUMMARY

Embodiments of this application disclose a screenshot method and a related device, to avoid miscontrol.

According to a first aspect, embodiments of this application provide a screenshot method. The method includes that the terminal responds to a non-stylus operation, and enters a screenshot waiting state, when the terminal establishes a connection to the stylus, the terminal detects an operation performed with the stylus on a touchscreen of the terminal, and if an operation of drawing a closed figure with the stylus is detected, the terminal takes a screenshot of interface content in the closed region drawn with the stylus.

According to the foregoing method, the terminal enters the screenshot waiting state by non-stylus touching by a user, and detects a stylus operation in the screenshot waiting state. If there is the operation of drawing a closed figure, the terminal takes a screenshot of the interface content in the closed figure. In a screenshot process, a button for enabling to enter the screenshot waiting state does not need to be set on the stylus. Because a button does not need to be set on the stylus, miscontrol in the screenshot process can be avoided, and the stylus is easily and gracefully used like a common pen in real form. In addition, after entering the screenshot waiting state, the terminal may also be compatible with a manner of taking a screenshot by the user with a finger, a knuckle, or the like, so that a conventional screenshot manner is considered.

With reference to the first aspect, in a first possible solution, that the terminal responds to a non-stylus operation, and enters a screenshot waiting state includes that the terminal responds to a three-finger swipe-down operation input by the user, and enters the screenshot waiting state, or the terminal responds to a knuckle tap operation input by the user, and enters the screenshot waiting state, or the terminal responds to a touch operation input by the user on a virtual screenshot button in a drop-down menu, and enters the screenshot waiting state.

With reference to any one of the first aspect or the foregoing possible implementations of the first aspect, in a second possible implementation of the first aspect, that if an operation of drawing a closed figure with the stylus is detected, the terminal takes a screenshot of interface content in the closed region drawn with the stylus includes the following.

If the operation of drawing a closed figure with the stylus is detected within a preset time period after the terminal enters the screenshot waiting state, the terminal takes a screenshot of the interface content in the closed region drawn with the stylus. Due to a limitation of the preset time period, even if the user does not draw a closed figure with the stylus to take a screenshot, the terminal does not always stay in the screenshot waiting state and can perform another task. This improves flexibility of the terminal. In addition, this manner can also avoid a misoperation to a greatest extent. For example, the user may misoperate the terminal to enter the screenshot waiting state. Therefore, the user usually does not draw a closed figure with the stylus immediately, but may draw a closed figure with the stylus after a long time period. However, after a long time period, if the operation of drawing a closed figure with the stylus is independently performed, an objective of the operation is usually not to take a screenshot. Therefore, in this application, a screenshot is taken only when the operation of drawing a closed figure with the stylus occurs within the preset time period. If the operation of drawing a closed figure with the stylus is performed after the preset time period, no screenshot is taken. This avoids a misoperation.

With reference to any one of the first aspect or the foregoing possible implementations of the first aspect, in a third possible implementation of the first aspect, before the terminal detects, when establishing a connection to the stylus, the operation performed with the stylus on the touchscreen of the terminal, the method further includes that the terminal determines whether the terminal establishes a connection to the stylus. It can be understood that the terminal further identifies a related operation of the stylus only when the terminal detects that the terminal establishes a connection to the stylus, instead of performing identification in every case. This can avoid many invalid identifications and reduce calculation overheads.

With reference to any one of the first aspect or the foregoing possible implementations of the first aspect, in a fourth possible implementation of the first aspect, if it is detected, on the touchscreen, that a plurality of touch points of a modulation signal of a nib of the stylus can be connected to form a closed region whose area is not smaller than a preset threshold, the operation of drawing a closed figure with the stylus is detected. It can be understood that, because the user may directly act on touch points when operating on the touchscreen with the stylus, a connection line of the touch points may reflect an area that the user wants to select. In addition, limiting an area of a closed region is mainly to avoid a misoperation. Usually, when the user wants to take a screenshot, the user does not draw a large circle but only takes a screenshot of a very small region. Therefore, this case is defined as a misoperation in this application, and a screenshot operation is not performed in this case.

With reference to any one of the first aspect or the foregoing possible implementations of the first aspect, in a fifth possible implementation of the first aspect, after the terminal responds to the non-stylus operation, and enters the screenshot waiting state, the method further includes the following.

If an operation of drawing a closed figure with a finger is detected, the terminal takes a screenshot of interface content in the closed region drawn with the finger. In addition, after entering the screenshot waiting state, the terminal may also be compatible with a manner of taking a screenshot by the user with a finger, a knuckle, or the like, so that a conventional screenshot manner is considered.

According to a second aspect, embodiments of this application provide a screenshot terminal. The terminal includes a response unit configured to respond to a non-stylus operation, and enter a screenshot waiting state, a detection unit configured to, when the terminal establishes a connection to the stylus, detect an operation performed with the stylus on a touchscreen of the terminal, and a screenshot unit configured to, when an operation of drawing a closed figure with the stylus is detected, take a screenshot of interface content in the closed region drawn with the stylus.

According to the foregoing method, the terminal enters the screenshot waiting state by non-stylus touching by a user, and detects a stylus operation in the screenshot waiting state. If there is the operation of drawing a closed figure, the terminal takes a screenshot of the interface content in the closed figure. In a screenshot process, a button for enabling to enter the screenshot waiting state does not need to be set on the stylus. Because a button does not need to be set on the stylus, miscontrol in the screenshot process can be avoided, and the stylus is easily and gracefully used like a common pen in real form. In addition, after entering the screenshot waiting state, the terminal may also be compatible with a manner of taking a screenshot by the user with a finger, a knuckle, or the like, so that a conventional screenshot manner is considered.

With reference to the second aspect, in a first possible solution, when responding to the non-stylus operation, and entering the screenshot waiting state, the response unit is further configured to respond to a three-finger swipe-down operation input by the user, and enter the screenshot waiting state, or respond to a knuckle tap operation input by the user, and enter the screenshot waiting state, or respond to a touch operation input by the user on a virtual screenshot button in a drop-down menu, and enter the screenshot waiting state.

With reference to any one of the second aspect or the foregoing possible implementations of the second aspect, in a second possible implementation of the second aspect, when taking, if the operation of drawing a closed figure with the stylus is detected, a screenshot of the interface content in the closed region drawn with the stylus, the screenshot unit is further configured to, if the operation of drawing a closed figure with the stylus is detected within a preset time period after the terminal enters the screenshot waiting state, take a screenshot of the interface content in the closed region drawn with the stylus. Due to a limitation of the preset time period, even if the user does not draw a closed figure with the stylus to take a screenshot, the terminal does not always stay in the screenshot waiting state and can perform another task. This improves flexibility of the terminal. In addition, this manner can also avoid a misoperation to a greatest extent. For example, the user may misoperate the terminal to enter the screenshot waiting state. Therefore, the user usually does not draw a closed figure with the stylus immediately, but may draw a closed figure with the stylus after a long time period. However, after a long time period, if the operation of drawing a closed figure with the stylus is independently performed, an objective of the operation is usually not to take a screenshot. Therefore, in this application, a screenshot is taken only when the operation of drawing a closed figure with the stylus occurs within the preset time period. If the operation of drawing a closed figure with the stylus is performed after the preset time period, no screenshot is taken. This avoids a misoperation.

With reference to any one of the second aspect or the foregoing possible implementations of the second aspect, in a third possible implementation of the second aspect, the terminal further includes a determining unit, and the determining unit is configured to, before the detection unit detects, when the terminal establishes a connection to the stylus, the operation performed with the stylus on the touchscreen of the terminal, determine whether the terminal establishes a connection to the stylus. It can be understood that the terminal further identifies a related operation of the stylus only when the terminal detects that the terminal establishes a connection to the stylus, instead of performing identification in every case. This can avoid many invalid identifications and reduce calculation overheads.

With reference to any one of the second aspect or the foregoing possible implementations of the second aspect, in a fourth possible implementation of the second aspect, if it is detected, on the touchscreen, that a plurality of touch points of a modulation signal of a nib of the stylus can be connected to form a closed region whose area is not smaller than a preset threshold, the operation of drawing a closed figure with the stylus is detected. It can be understood that, because the user may directly act on touch points when operating on the touchscreen with the stylus, a connection line of the touch points may reflect an area that the user wants to select. In addition, limiting an area of a closed region is mainly to avoid a misoperation. Usually, when the user wants to take a screenshot, the user does not draw a large circle but only takes a screenshot of a very small region. Therefore, this case is defined as a misoperation in this application, and a screenshot operation is not performed in this case.

With reference to any one of the second aspect or the foregoing possible implementations of the second aspect, in a fifth possible implementation of the second aspect, the screenshot unit is further configured to, after the terminal enters the screenshot waiting state, if an operation of drawing a closed figure with a finger is detected, take a screenshot of interface content in the closed region drawn with the finger. In addition, after entering the screenshot waiting state, the terminal may also be compatible with a manner of taking a screenshot by the user with a finger, a knuckle, or the like, so that a conventional screenshot manner is considered.

According to a third aspect, embodiments of this application provide a screenshot terminal. The screenshot terminal includes a processor, a memory, and a touchscreen. The memory is configured to store a computer program, and the processor invokes the computer program to perform the following operations of responding to a non-stylus operation and entering a screenshot waiting state, when the terminal establishes a connection to the stylus, detecting an operation performed with the stylus on a touchscreen of the terminal, and if an operation of drawing a closed figure with the stylus is detected, taking a screenshot of interface content in the closed region drawn with the stylus.

According to the foregoing method, the terminal enters the screenshot waiting state by non-stylus touching by a user, and detects a stylus operation in the screenshot waiting state. If there is the operation of drawing a closed figure, the terminal takes a screenshot of the interface content in the closed figure. In a screenshot process, a button for enabling to enter the screenshot waiting state does not need to be set on the stylus. Because a button does not need to be set on the stylus, miscontrol in the screenshot process can be avoided, and the stylus is easily and gracefully used like a common pen in real form. In addition, after entering the screenshot waiting state, the terminal may also be compatible with a manner of taking a screenshot by the user with a finger, a knuckle, or the like, so that a conventional screenshot manner is considered.

With reference to the third aspect, in a first possible solution, when responding to the non-stylus operation and entering the screenshot waiting state, the processor is further configured to respond to a three-finger swipe-down operation input by the user, and enter the screenshot waiting state, or respond to a knuckle tap operation input by the user, and enter the screenshot waiting state, or respond to a touch operation input by the user on a virtual screenshot button in a drop-down menu, and enter the screenshot waiting state.

With reference to any one of the third aspect or the foregoing possible implementation of the third aspect, in a second possible implementation of the third aspect, when taking, if the operation of drawing a closed figure with the stylus is detected, a screenshot of the interface content in the closed region drawn with the stylus, the processor is further configured to, if the operation of drawing a closed figure with the stylus is detected within a preset time period after the terminal enters the screenshot waiting state, take a screenshot of the interface content in the closed region drawn with the stylus. Due to a limitation of the preset time period, even if the user does not draw a closed figure with the stylus to take a screenshot, the terminal does not always stay in the screenshot waiting state and can perform another task. This improves flexibility of the terminal. In addition, this manner can also avoid a misoperation to a greatest extent. For example, the user may misoperate the terminal to enter the screenshot waiting state. Therefore, the user usually does not draw a closed figure with the stylus immediately, but may draw a closed figure with the stylus after a long time period. However, after a long time period, if the operation of drawing a closed figure with the stylus is independently performed, an objective of the operation is usually not to take a screenshot. Therefore, in this application, a screenshot is taken only when the operation of drawing a closed figure with the stylus occurs within the preset time period. If the operation of drawing a closed figure with the stylus is performed after the preset time period, no screenshot is taken. This avoids a misoperation.

With reference to any one of the third aspect or the foregoing possible implementations of the third aspect, in a third possible implementation of the third aspect, before detecting, when the terminal establishes a connection to the stylus, the operation performed with the stylus on the touchscreen of the terminal, the processor is further configured to determine whether the terminal establishes a connection to the stylus. It can be understood that the terminal further identifies a related operation of the stylus only when the terminal detects that the terminal establishes a connection to the stylus, instead of performing identification in every case. This can avoid many invalid identifications and reduce calculation overheads.

With reference to any one of the third aspect or the foregoing possible implementations of the third aspect, in a fourth possible implementation of the third aspect, if it is detected, on the touchscreen, that a plurality of touch points of a modulation signal of a nib of the stylus can be connected to form a closed region whose area is not smaller than a preset threshold, the operation of drawing a closed figure with the stylus is detected. It can be understood that, because the user may directly act on touch points when operating on the touchscreen with the stylus, a connection line of the touch points may reflect an area that the user wants to select. In addition, limiting an area of a closed region is mainly to avoid a misoperation. Usually, when the user wants to take a screenshot, the user does not draw a large circle but only takes a screenshot of a very small region. Therefore, this case is defined as a misoperation in this application, and a screenshot operation is not performed in this case.

With reference to any one of the third aspect or the foregoing possible implementations of the third aspect, in a fifth possible implementation of the third aspect, after the processor responds to the non-stylus operation and enters the screenshot waiting state, the processor is further configured to, if an operation of drawing a closed figure with a finger is detected, take a screenshot of interface content in the closed region drawn with the finger. In addition, after entering the screenshot waiting state, the terminal may also be compatible with a manner of taking a screenshot by the user with a finger, a knuckle, or the like, so that a conventional screenshot manner is considered.

According to a fourth aspect, embodiments of this application provide a terminal, and the terminal is configured to perform a method described in any one of the first aspect or the possible implementations of the first aspect.

According to a fifth aspect, embodiments of this application provide a terminal. The terminal includes one or more processors and one or more memories. The one or more memories are coupled to the one or more processors, and are configured to store a computer program. When the one or more processors run the computer program, the terminal is enabled to implement the method described in any one of the first aspect or the possible implementations of the first aspect.

According to a sixth aspect, embodiments of this application provide a computer-readable storage medium. The computer-readable storage medium stores a computer program, and when the computer program is run on a terminal, the method described in any one of the first aspect or the possible implementations of the first aspect is implemented.

According to a seventh aspect, embodiments of this application provide a computer program product. When the computer program product is run on a terminal, the terminal is enabled to perform the method described in any one of the first aspect or the possible implementations of the first aspect.

BRIEF DESCRIPTION OF DRAWINGS

The following describes accompanying drawings used in embodiments of this application.

DESCRIPTION OF EMBODIMENTS

The following describes in detail technical solutions in embodiments of this application with reference to the accompanying drawings. In description of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: only A exists, both A and B exist, and only B exists. In addition, in the descriptions in embodiments of this application, "a plurality of" means two or more than two. If descriptions such as "first" and "second" are used below, "first", "second", and the like are merely used for a purpose of description, and shall not be understood as imply or implying relative importance or implicitly indicating a quantity of indicated technical features. Therefore, a feature restricted by "first" or "second" may explicitly indicate or implicitly include one or more such features. In the descriptions of embodiments of this application, "a plurality of" means two or more than two unless otherwise specified.

Figure 1A:
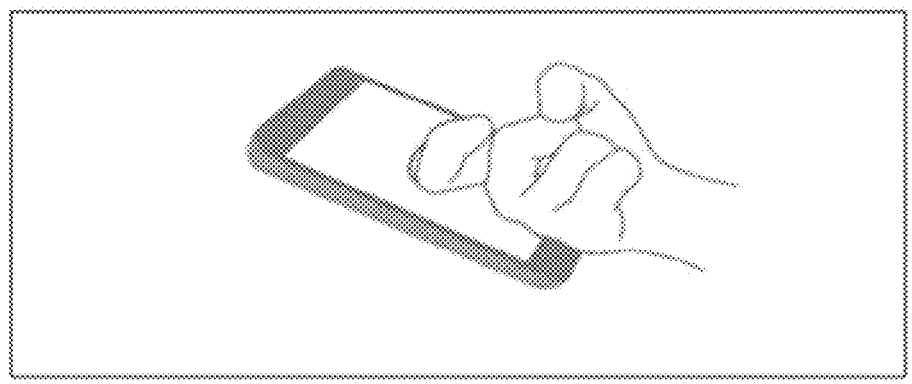
FIG. 1A is a schematic diagram of a screenshot scenario according to an embodiment of this application.
Figure 1B:
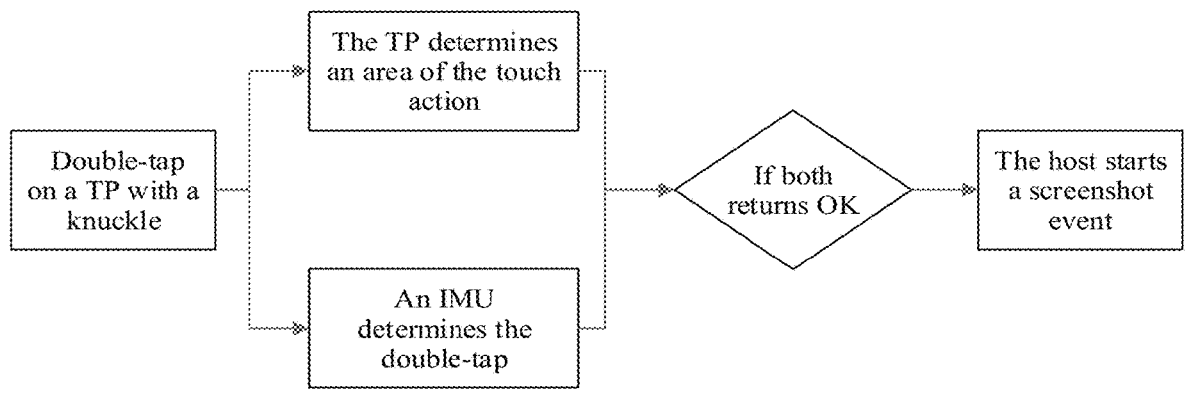
FIG. 1B is a schematic flowchart of a screenshot method according to an embodiment of this application.
Figure 2A:
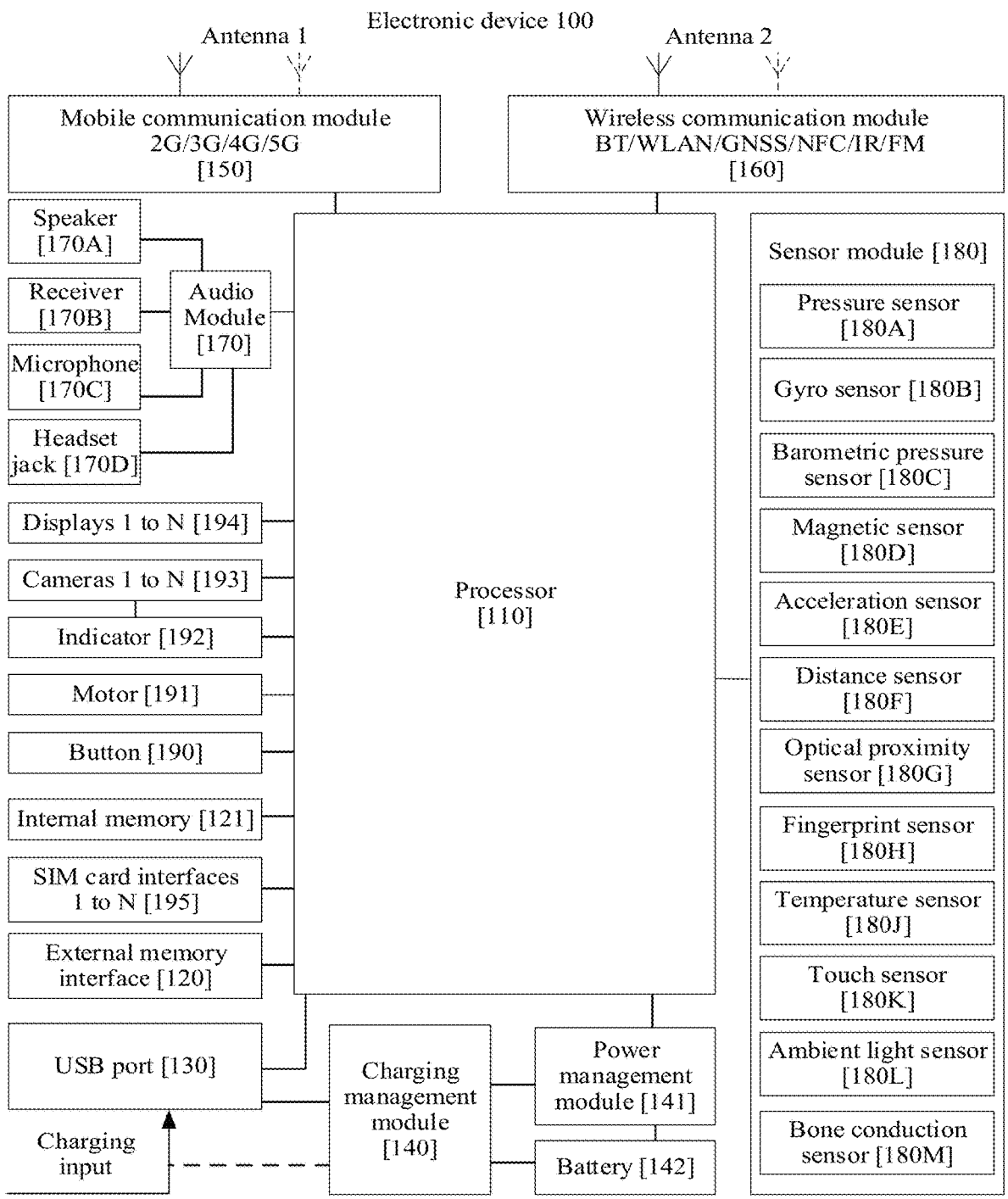
FIG. 2A is a schematic diagram of a structure of an electronic device according to an embodiment of this application.

As shown in FIG. 2A, a terminal in embodiments of this application may be an electronic device 100. The electronic device 100 is used as an example below to describe embodiments in detail. It should be understood that the electronic device 100 shown in FIG. 2A is merely an example of the terminal, and the electronic device 100 may have more or fewer components than those shown in the figure, or may combine two or more components, or may have different component configurations. Various components shown in the FIG. 2A may be implemented by using hardware that includes one or more signal processing and/or application-specific integrated circuits, software, or a combination of hardware and software.

The electronic device 100 may include a processor 110, an external memory interface 120, an internal memory 121, a Universal Serial Bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in embodiments of this application does not constitute a specific limitation on the electronic device 100. In some other embodiments of this application, the electronic device 100 may include more or fewer components than the components shown in the figure, some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction fetching and instruction execution.

The memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110, and improves system efficiency.

In some embodiments, the processor 110 may include one or more interfaces. The interface may include an Inter-Integrated Circuit (I2C) interface, an I2C Sound (I2S) interface, a pulse code modulation (PCM) interface, a universal asynchronous receiver/transmitter (UART) interface, a Mobile Industry Processor Interface (MIPI), a general-purpose input/output (GPIO) interface, a SIM interface, a USB interface, and/or the like.

The I2C interface is a two-way synchronous serial bus, including a serial data line (SDL) and a serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a BLUETOOTH headset.

The PCM interface may also be configured to perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call through a BLUETOOTH headset. Both the I2S interface and the PCM interface may be configured to perform the audio communication.

The UART interface is a universal serial data bus, and is configured to perform asynchronous communication. The bus may be a two-way communications bus. The bus switches to-be-transmitted data between serial communication and parallel communication. In some embodiments, the UART interface is usually configured to connect the processor 110 to the wireless communications module 160. For example, the processor 110 communicates with a BLUETOOTH module in the wireless communications module 160 through the UART interface, to implement a BLUETOOTH function. In some embodiments, the audio module 170 may transmit an audio signal to the wireless communications module 160 through the UART interface, to implement a function of playing music through the BLUETOOTH headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may be further configured as the I2C interface, the I2S interface, the UART interface, the MIPI interface, or the like.

The USB interface 130 is an interface that conforms to a USB standard specification, and may be further a mini USB interface, a micro USB interface, a USB Type C interface, or the like. The USB interface 130 may be configured to connect to the charger to charge the electronic device 100, or may be configured to transmit data between the electronic device 100 and a peripheral device, or may be configured to connect to a headset, to play audio through the headset. The interface may be further configured to connect to another electronic device such as an augmented reality (AR) device.

It may be understood that an interface connection relationship between modules illustrated in embodiments of this application is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments in which wired charging is used, the charging management module 140 may receive a charging input from the wired charger through the USB interface 130. In some embodiments in which wireless charging is used, the charging management module 140 may receive a wireless charging input through a wireless charging coil of the electronic device 100. The charging management module 140 may further supply power to the electronic device by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may further be multiplexed to improve antenna utilization. For example, the antenna 1 may be multiplexed as a diversity antenna in a wireless local area network. In some other embodiments, an antenna may be used in combination with a tuning switch.

The mobile communications module 150 may provide a wireless communication solution that includes second generation (2G)/third generation (3G)/fourth generation (4G)/fifth generation (5G) or the like and that is applied to the electronic device 100. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 may be disposed in the same device as at least some modules of the processor 110.

The modem processor may include a modulator and a demodulator. The modulator is configured to modulate a to-be-sent low-frequency baseband signal into a medium-frequency or high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, and the like), or displays an image or a video on the display 194. In some embodiments, the modem processor may be an independent component. In some other embodiments, the modem processor may be independent of the processor 110, and is disposed in the same device as the mobile communications module 150 or another function module.

The wireless communications module 160 may provide a wireless communication solution that is applied to the electronic device 100, and that includes a wireless local area network (WLAN) (for example, a WI-FI network), BLUETOOTH (BT), a global navigation satellite system (GNSS), frequency modulation (FM), a near-field communication (NFC) technology, an infrared (IR) technology, or the like. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a Global System for Mobile Communications (GSM), a General Packet Radio Service (GPRS), code-division multiple access (CDMA), wideband CDMA (WCDMA), time division-synchronous CDMA (TD-SCDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BEIDOU navigation satellite system (BDS), a quasi-zenith satellite system (QZSS), and/or a satellite based augmentation system (SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs, which execute program instructions to generate or change display information.

The display 194 is configured to display an image, a video, or the like. The display 194 includes a display panel. The display panel may use a liquid-crystal display (LCD), an organic light-emitting diode (LED) (OLED), an active-matrix OLED (AMOLED), a flexible LED (FLED), a mini-LED, a micro-LED, a micro-OLED, a quantum dot LED (QLED), or the like. In some embodiments, the electronic device 100 may include one or N displays 194, where N is a positive integer greater than 1.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and a ray of light is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected to the photosensitive element. The light-sensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as red, green, and blue (RGB) or luma, blue projection, and red projection (YUV). In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. Therefore, the electronic device 100 may play or record videos in a plurality of coding formats, for example, Moving Picture Experts Group (MPEG)-1, MPEG-2, MPEG-3, and MPEG-4.

The NPU is a neural-network (NN) computing processor. The NPU quickly processes input information with reference to a structure of a biological neural network, for example, a transfer mode between human brain neurons, and may further continuously perform self-learning. Applications such as intelligent cognition of the electronic device 100, for example, image recognition, facial recognition, speech recognition, and text understanding, may be implemented through the NPU.

The external memory interface 120 may be used to connect to an external memory card, for example, a micro Secure Digital (SD) card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 performs various function applications and data processing of the electronic device 100 by running the instructions stored in the internal memory 121. The internal memory 121 may include a program storage area and a data storage area. The program storage area may store an operating system, an application required by at least one function (for example, a voice playing function or an image playing function), and the like. The data storage area may store data (such as audio data and a phone book) and the like that are created during use of the electronic device 100. In addition, the internal memory 121 may include a high-speed random-access memory (RAM), or may include a nonvolatile memory, for example, at least one magnetic disk storage device, a flash memory, or a Universal Flash Storage (UFS).

The electronic device 100 may implement an audio function such as music playing and recording through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may further be configured to code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mike" or a "microphone", is configured to convert a sound signal into an electrical signal. When a user makes a call, or sends voice information, the user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to implement a noise reduction function, in addition to collecting a sound signal. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB interface 130, or may be a 3.5-millimeter (mm) Open Mobile Electronic Device Platform (OMTP) standard interface, or a Cellular Telecommunications Industry Association (CTIA) of the United States of America (USA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may also calculate a touch position based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an application icon "Messages", an instruction for viewing a Short Message Service (SMS) message is executed. When a touch operation whose touch operation intensity is greater than or equal to the first pressure threshold is performed on an application icon "Messages", an instruction for creating an SMS message is executed.

The gyroscope sensor 180B may be configured to determine a motion posture of the electronic device 100. In some embodiments, an angular velocity of the electronic device 100 around three axes (namely, axes x, y, and z) may be determined by using the gyroscope sensor 180B. The gyroscope sensor 180B may be configured to implement image stabilization during shooting. For example, when the shutter is pressed, the gyroscope sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a flip phone, the electronic device 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the electronic device 100, and when the electronic device 100 is still, a magnitude and a direction of gravity may be detected. The acceleration sensor may be configured to identify a posture of the electronic device, and is used in an application such as switching between a landscape mode and a portrait mode or a pedometer.

The distance sensor 180F is configured to measure a distance. The electronic device 100 may measure the distance in an infrared or a laser manner. In some embodiments, in a photographing scenario, the electronic device 100 may measure a distance by using the distance sensor 180F, to implement quick focusing.

The optical proximity sensor 180G may include, for example, an LED and an optical detector such as a photodiode. The LED may be an infrared LED. The electronic device 100 emits infrared light by using the LED. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K is also referred to as a "touch panel". The touch sensor 180K may be disposed in the display 194, and the touch sensor 180K and the display 194 form a touchscreen, which is also referred to as a "touch screen". The touch sensor 180K is configured to detect a touch operation on or near the touch sensor 180K. The touch sensor may transfer the detected touch operation to the application processor, to determine a type of a touch event. A visual output related to the touch operation may be provided on the display 194. In some other embodiments, the touch sensor 180K may alternatively be disposed on a surface of the electronic device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to user setting and function control of the electronic device 100.

The motor 191 may generate a vibration prompt. The motor 191 may be configured to produce an incoming call vibration prompt and a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, time reminding, information receiving, an alarm clock, and a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be inserted into the same SIM card interface 195 at the same time. The plurality of cards may be of a same type or of different types. The SIM card interface 195 may be compatible with different types of SIM cards. The SIM card interface 195 is also compatible to an external storage card. The electronic device 100 interacts with a network by using the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

A software system of the electronic device 100 may use a layered architecture, an event-driven architecture, a microkernel architecture, a micro service architecture, or a cloud architecture. In an embodiment of this application, an ANDROID system with a layered architecture is used as an example to describe a software structure of the electronic device 100.

Figure 2B:
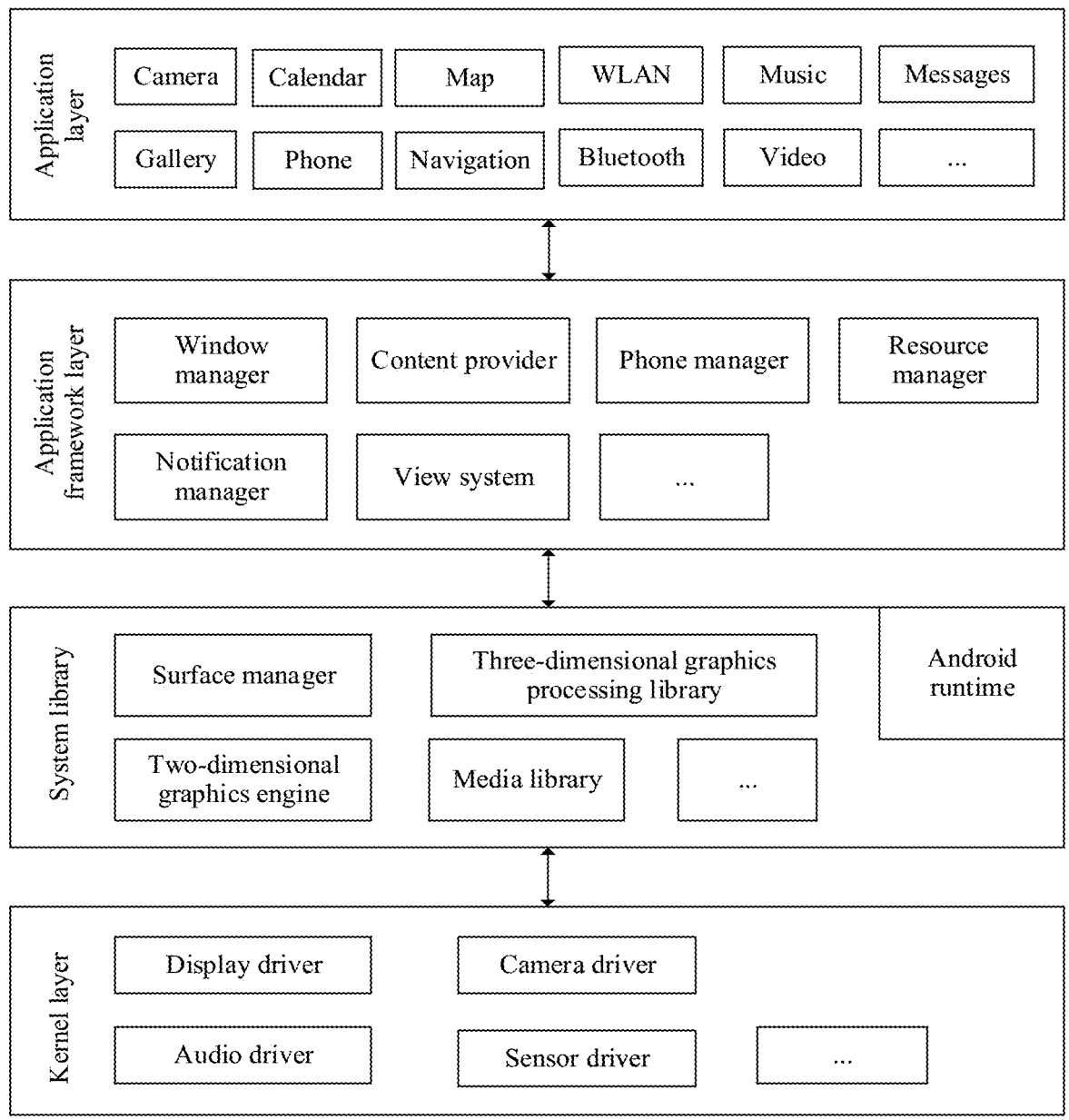
FIG. 2B is a schematic diagram of a scenario of an operating system according to an embodiment of this application.

FIG. 2B is a block diagram of a software structure of an electronic device 100 according to an embodiment of this application.

In the layered architecture, software is divided into several layers, and each layer has a clear role and task. The layers communicate with each other through a software interface. In some embodiments, the ANDROID system is divided into four layers, namely, an application layer, an application framework layer, an ANDROID runtime and system library, and a kernel layer from top to bottom.

The application layer may include a series of application packages.

As shown in FIG. 2B, the application package may include applications such as camera, gallery, calendar, phone, map, navigation, WLAN, BT, music, videos, and messages.

The application framework layer provides an application programming interface (API) and a programming framework for an application at the application layer. The application framework layer includes some predefined functions.

As shown in FIG. 2B, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the electronic device 100, for example, management of call statuses (including answering, declining, and the like).

The resource manager provides, for an application, various resources such as a localized character string, an icon, a picture, a layout file, and a video file.

The notification manager enables an application to display notification information in the status bar, and may be configured to transmit a notification-type message. The displayed information may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an alert sound is played, the electronic device vibrates, or the indicator light blinks.

The ANDROID runtime includes a core library and a virtual machine. The ANDROID runtime is responsible for scheduling and management of the ANDROID system.

The kernel library includes two parts. One part is a performance function that needs to be invoked by JAVA language, and the other part is an ANDROID kernel library.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of function modules, for example, a surface manager, a media library, a three-dimensional (3D) graphics processing library (for example, OpenGL embedded system (ES)), and a two-dimensional (2D) graphics engine (for example, SGL).

The surface manager is configured to manage a display subsystem and provide fusion of 2D and 3D layers for a plurality of applications.

The media library supports playback and recording in a plurality of commonly used audio and video formats, a static image file, and the like. The media library may support a plurality of audio and video coding formats, such as MPEG-4, H.264, MPEG-1 Audio Layer III or MPEG-2 Audio Layer III (MP3), Advanced Audio Coding (AAC), Adaptive Multi-Rate (AMR), Joint Photographic Experts Group (JPEG), and Portable Network Graphics (PNG).

The 3D graphics processing library is configured to implement three-dimensional graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes examples of working procedures of software and hardware of the electronic device 100 with reference to a photographing scenario.

When the touch sensor 180K receives a touch operation (or referred to as a touch control operation), a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a single-tap touch operation, and a control corresponding to the single-tap operation is a control of a camera application icon. A camera application invokes an interface at the application framework layer to enable the camera application, then enables a camera driver by invoking the kernel layer, and captures a static image or a video through the camera 193.

Figure 3:
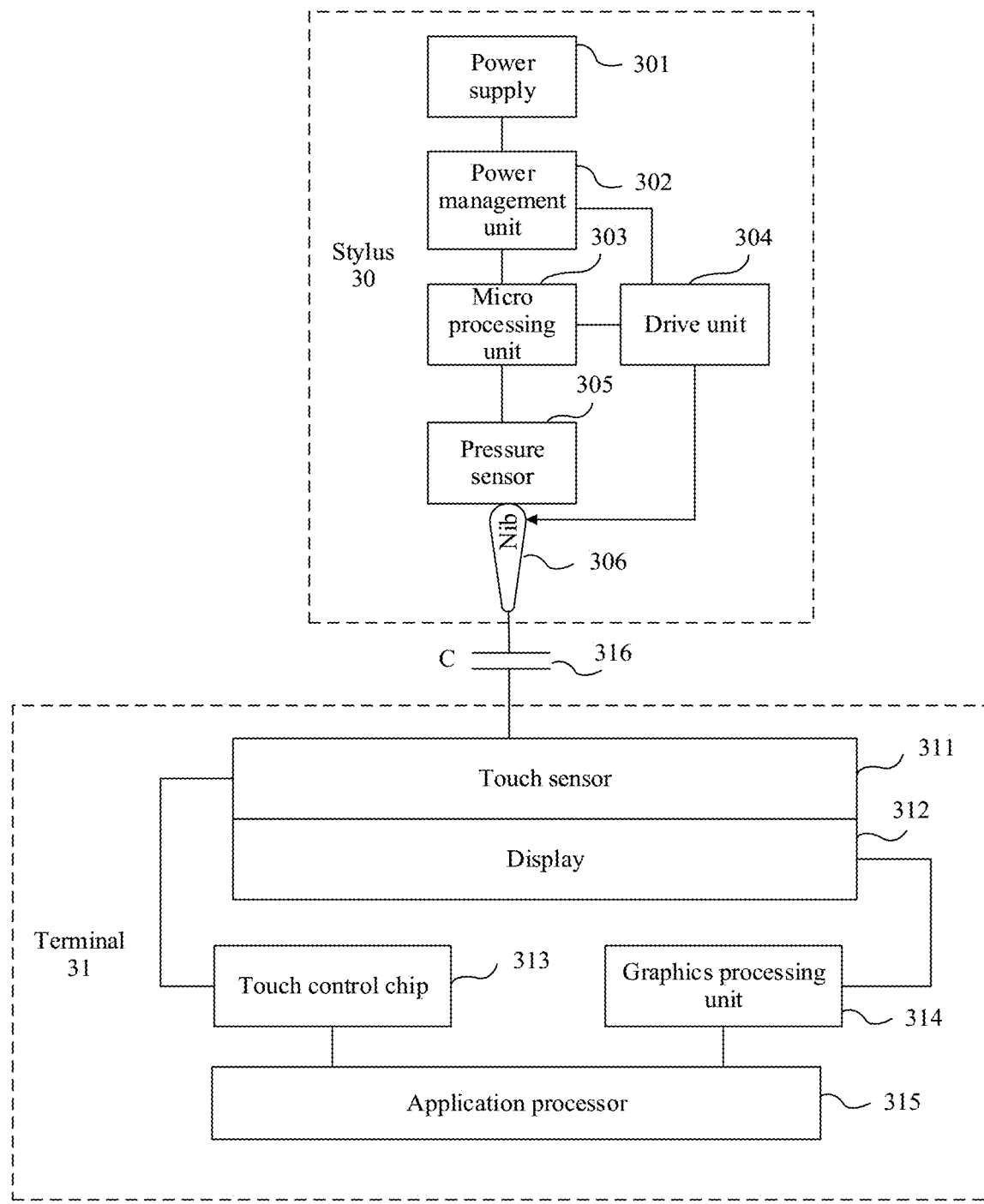
FIG. 3 is a schematic architectural diagram of a stylus system according to an embodiment of this application.

The following describes an architecture of a stylus system provided in embodiments of this application. FIG. 3 is an architectural diagram of a stylus system according to this application. As shown in FIG. 3, in the architectural diagram of the stylus system according to this application, a stylus system 30 includes a stylus 30 and a terminal 31. The terminal 31 may be the electronic device 100 in FIG. 2A.

The stylus is an active capacitive stylus. The active capacitive stylus may include a power supply 301, a power management unit (PMU) 302, a microcontroller unit (MCU) 303, a driver unit 304, a pressure sensor 305, and a nib 306.

The power supply 301 may be a rechargeable lithium battery, a standard replaceable battery, or the like. The power management unit 302 may include an adaptive USB-compatible pulse width modulation (PMW) charging circuit, a buck direct current (DC)-DC converter, an LCD backlight-driver circuit, and the like. The power management unit 302 may supply power required by the microcontroller unit 303, the driver unit 304, the pressure sensor 305, and the like of the stylus 30. The microcontroller unit 303 may be configured to generate a capacitive stylus excitation signal, receive and analyze pressure data reported by the pressure sensor 305, detect a status of a functional key, manage power mode switching, and the like. The pressure sensor 305 may be configured to detect pressure data on the nib of the stylus, and report the detected pressure data on the nib of the stylus 30 to the microcontroller unit 303. The driver unit 304 may be configured to provide a voltage drive signal to the nib of the stylus. After receiving the voltage drive signal, the nib of the stylus may output a signal that can be detected by the terminal, for example, an electrical signal, also referred to as a modulation signal. When the nib approaches the terminal, the terminal may detect the electrical signal output by the nib. In other words, the terminal detects an input signal from the stylus. After the terminal detects the input signal from the stylus, the terminal may determine a specific location of the nib 306 of the stylus 30 on a touch sensor 311 of the terminal 31 through a touch control chip. The nib of the stylus may continuously send a signal, for example, the electrical signal, also referred to as the modulation signal. The nib of the stylus may continuously send a low-frequency signal (for example, a signal between 30 kilohertz (kHz) and 70 kHz). The signal sent by the nib of the stylus may include information such as pressure felt by the nib, a key status and an identifier (ID) serial number of the stylus. In an optional case, the stylus may be connected to the terminal through BT, WI-FI, ZIGBEE, or the like. After detecting that the nib is in contact with a touchscreen, the stylus may indicate, through the BT, the terminal to adjust a detection frequency for the stylus and open notepad.

The terminal 31 may include the touch sensor 311, a display 312, a touch control chip 313, a GPU 314, and an application processor (AP) 315. The touch control chip 312 may determine a capacitance signal detected by the touch sensor 311 and a location of the detected capacitance signal, and report the capacitance signal and the location to the application processor 315. The display 312 may be the display 194 in FIG. 2A. Details are not described herein again.

Due to a coupling capacitor 316 formed between the nib 306 and the touch sensor 311, the touch sensor 311 may detect the capacitance signal based on the coupling capacitor.

The touch sensor 311 may be configured to detect a capacitance signal generated by a proximity operation of the stylus 30 or a capacitance signal generated by a touch operation of a finger, and upload a capacitance signal generated when the stylus 30 approaches the touchscreen or the capacitance signal generated by the touch operation of the finger to the stylus touch control chip 313.

Figure 4:
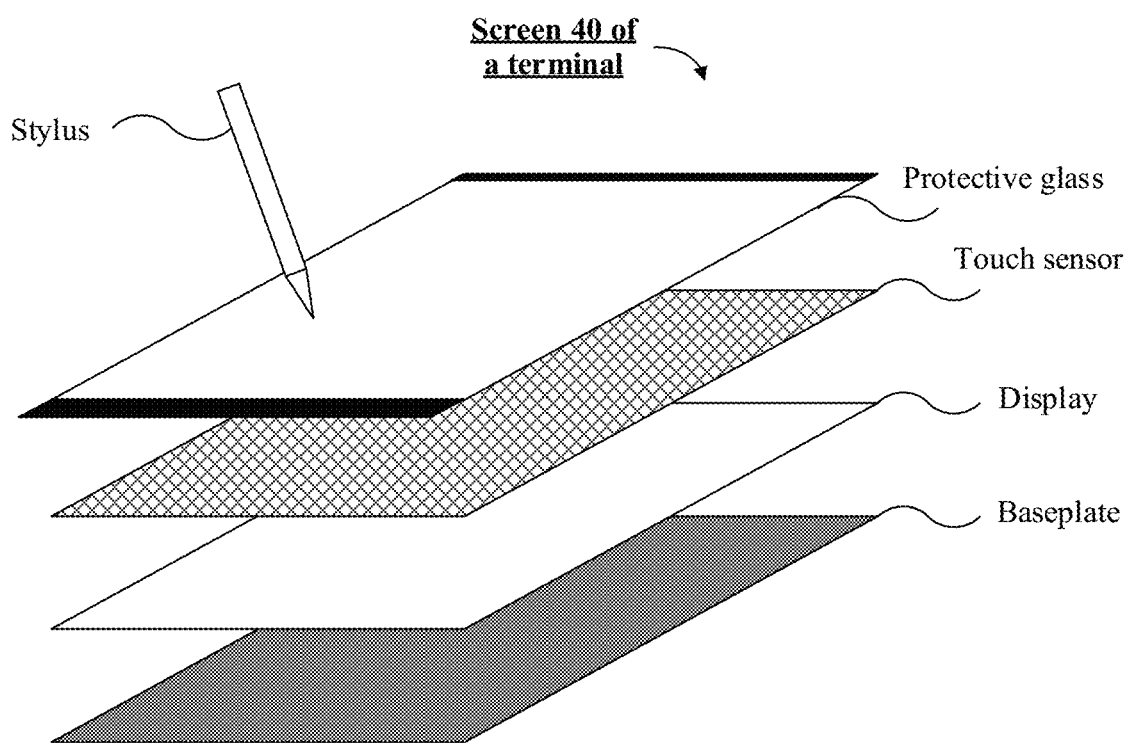
FIG. 4 is a schematic diagram of a structure of a screen of a terminal according to an embodiment of this application.

FIG. 4 shows a screen 40 of a terminal according to this application. The screen 40 of the terminal may include protective glass, a touch sensor (or a touch control sensor), a display, and a baseplate. The touch sensor and the display may form a touchscreen. For specific content, refer to the apparatus embodiment shown in FIG. 2A. Details are not described herein.

Figure 5A:
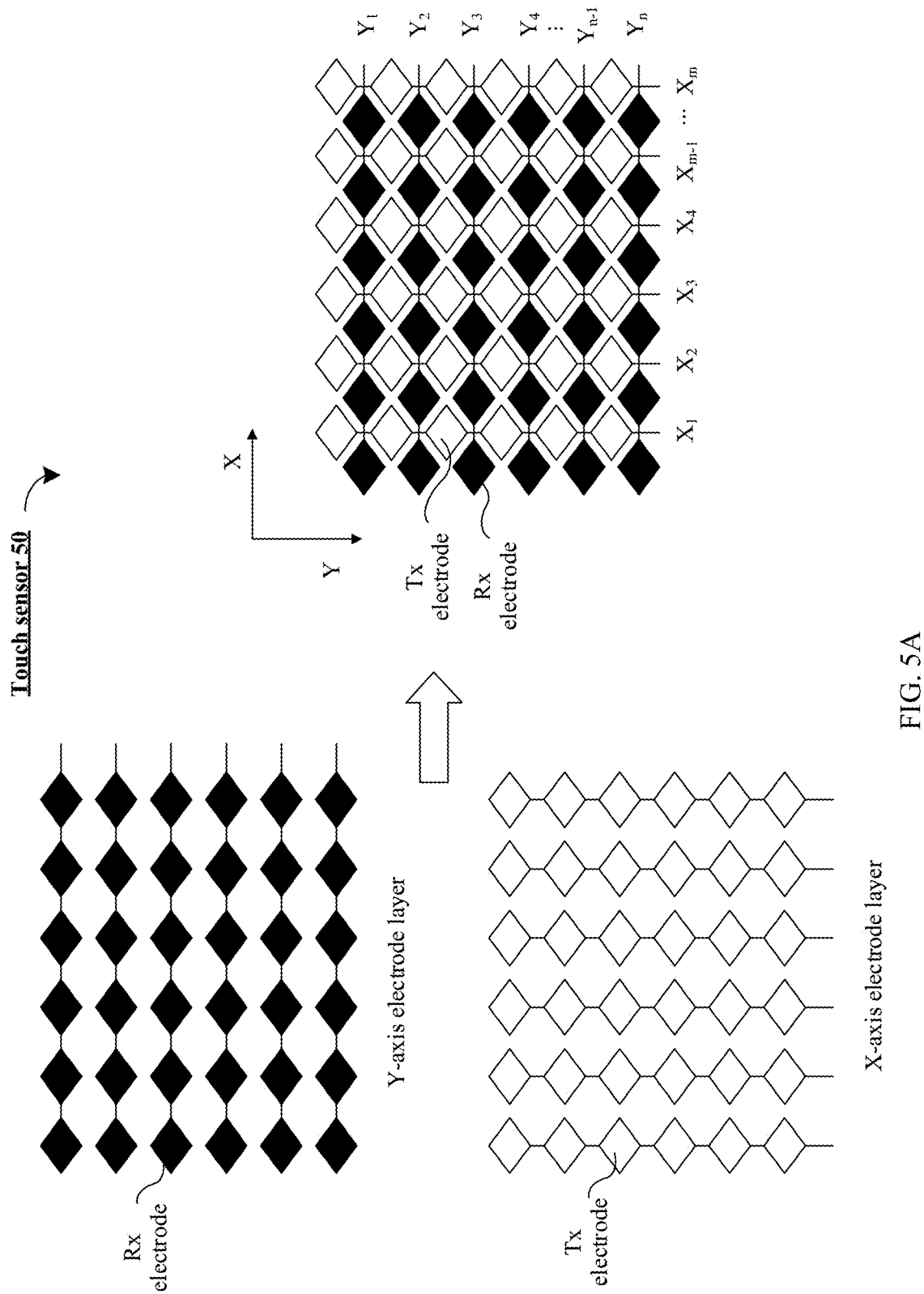
FIG. 5A is a schematic diagram of a scenario of a touch sensor according to an embodiment of this application.

FIG. 5A shows a touch sensor 50 according to this application. The touch sensor 50 may include an X-axis electrode layer and a Y-axis electrode layer. The X-axis electrode layer may include a plurality of transmit (Tx) electrodes distributed in a matrix manner. The Y-axis electrode layer may include a plurality of receive (Rx) electrodes distributed in a matrix manner. A terminal may detect a touch operation of a finger through self-capacitance detection and mutual capacitance detection of a touchscreen. The terminal may detect an input operation of a stylus through the mutual capacitance detection of the touchscreen.

Based on the touch sensor 50 shown in FIG. 5A, the following describes mutual capacitance detection and self-capacitance detection in this application.

1. The mutual capacitance detection: the transmit (Tx) electrodes and receive (Rx) electrodes on the touch sensor 50 of the terminal form a network in which the transmit electrodes intersect with the receive electrodes. A mutual capacitance (namely, a capacitance formed by a Tx electrode and an adjacent Rx electrode) is formed at a crosspoint (namely, a coordinate point) between the Tx electrode and the Rx electrode. When the terminal scans and detects magnitude of a mutual capacitance of each coordinate point on the touchscreen, a touch control chip that is connected to the touchscreen and that is on the terminal sequentially sends an excitation signal on each Tx electrode. Then, the touch control chip scans a signal received by each Rx electrode. The touch control chip converts a measured voltage value into a digital signal in an analog-to-digital manner, and calculates a capacitance value. When the finger touches the touchscreen, the finger absorbs part of an excitation signal from the Tx electrode. Therefore, a signal received by the Rx electrode is weakened, so that touch location information of the finger can be calculated based on a capacitance change of each coordinate point on the touch sensor.

Figure 5B:
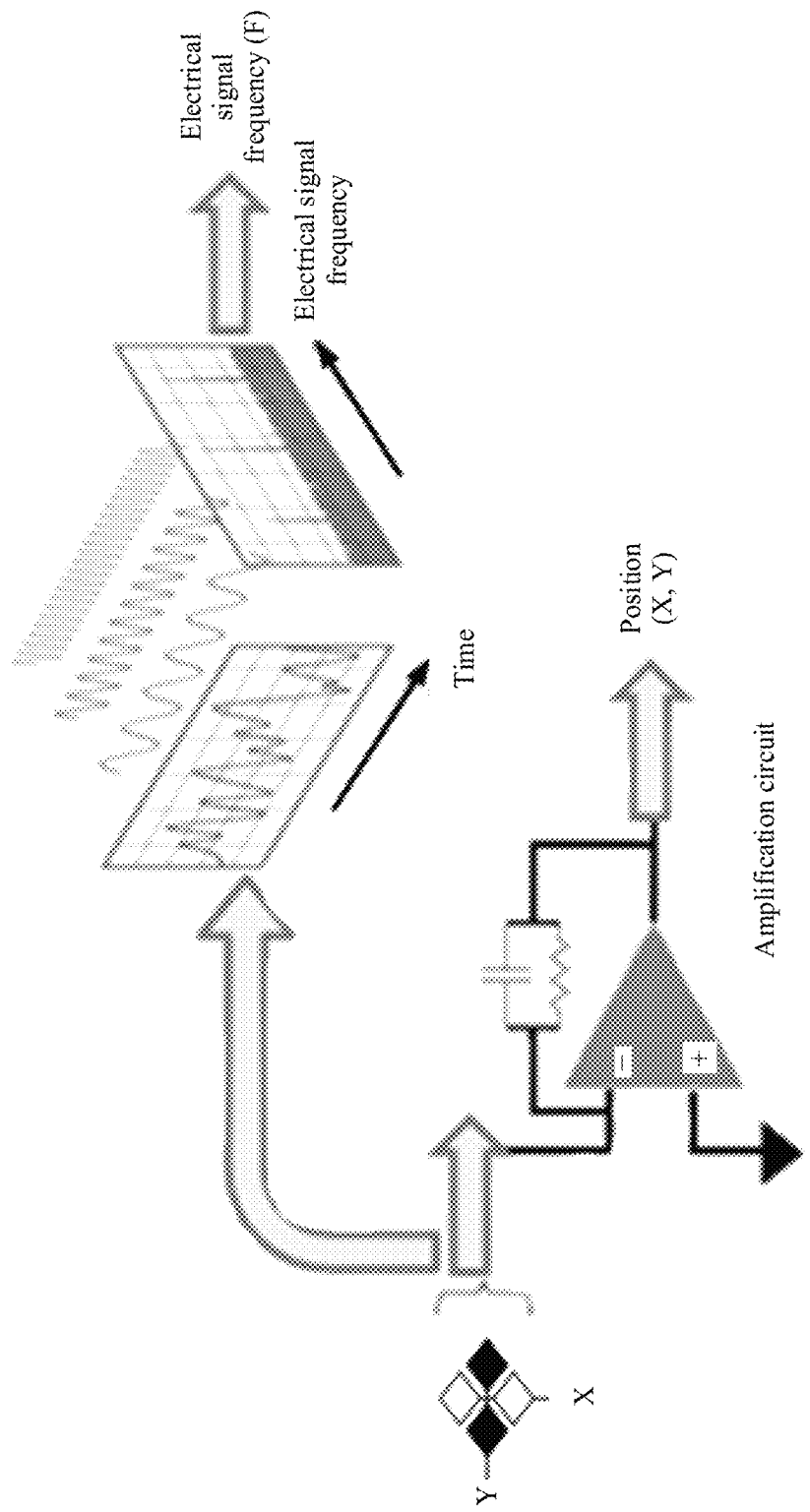
FIG. 5B is a schematic diagram of a scenario of processing an electrical signal by a touchscreen according to an embodiment of this application.

A manner in which the terminal detects the stylus is a mutual capacitance detection manner. When the stylus (active capacitive stylus) approaches the touchscreen and a nib of the stylus sends a signal, the nib of the stylus may replace the Tx electrode on the touchscreen. In this case, the Tx electrode and the original Rx electrode on the touchscreen sense a transmit signal of the stylus in turn in directions of a horizontal axis (the X axis) and a vertical axis (the Y axis) on the touchscreen. In this case, a mutual capacitance value of a contact point of the stylus received by the terminal is a coupling capacitance between the nib of the stylus and the Tx electrode or the Rx electrode on the touchscreen. In this way, the terminal may locate a capacitance peak crosspoint on the X axis and the Y axis to obtain location information of the stylus nib on the touchscreen. As shown in FIG. 5B, a Tx signal detected on the touchscreen includes a signal strength and a signal frequency, and the two pieces of information need to be separated. Usually the separated signal strength is very weak, and needs to be amplified before related post-processing is performed. Location information is calculated based on an envelope of the signal. In addition, a frequency of the separated signal is used to determine that the signal is a signal sent with the stylus instead of another signal.

A mutual capacitance detection frequency may be a frequency at which the touchscreen collects a capacitance value (namely, a mutual capacitance value) between a Tx electrode and an Rx electrode of each touch point on the touchscreen, and reports the mutual capacitance value on the touchscreen to the touch control chip. For example, 120 hertz (Hz) frequency mutual capacitance detection may mean that the touchscreen collects a mutual capacitance value between a transmit (Tx) electrode and a receive (Rx) electrode of each electrode crosspoint on the touchscreen, and reports the mutual capacitance value of each electrode crosspoint to the touch control chip at a frequency of 120 Hz.

The mutual capacitance detection frequency may also refer to a processing frequency at which the touch control chip calculates a coordinate location of the touch point based on the mutual capacitance value of each electrode crosspoint. The 120 Hz frequency mutual capacitance detection may also mean that after the touchscreen reports the mutual capacitance value between the Tx electrode and the Rx electrode of each electrode crosspoint on the touchscreen to the touch control chip, the touch control chip calculates the coordinate location of the touch point at a processing frequency of 120 Hz based on the mutual capacitance value between the Tx electrode and the Rx electrode of each electrode crosspoint.

2. The self-capacitance detection: when the terminal detects a touch operation of a user on the touchscreen in a self-capacitive manner, the Tx electrodes and the Rx electrodes on the touchscreen separately form capacitances (namely, self-capacitances) with the ground. The Tx electrodes and the Rx electrodes form a network in which the Tx electrodes intersect with the Rx electrodes. When the finger touches a capacitive touchscreen, a capacitance of the finger is superimposed on a screen capacitance (a self-capacitance formed by the Tx electrode and the ground, or a self-capacitance formed by the Rx electrode and the ground) of the touchscreen, to change an amount of the screen capacitance. When the terminal scans and detects magnitude of self-capacitances of electrodes at each coordinate point on the touchscreen, the terminal sequentially detects a Tx electrode array and an Rx electrode array, and may separately determine a horizontal (Tx electrode arrangement direction) coordinate and a vertical (Rx electrode arrangement direction) coordinate based on a change of the capacitances before and after a touch, to form touch coordinates on a two-dimensional plane.

A self-capacitance detection frequency may be a frequency at which the touchscreen collects self-capacitance values of electrodes at each touch point on the touchscreen, and reports the mutual capacitance values on the touchscreen to the touch control chip. For example, 120 Hz frequency self-capacitance detection may mean that the touchscreen collects a self-capacitance value of each electrode on the touchscreen, and reports the self-capacitance value of each electrode to the touch control chip at the frequency of 120 Hz.

The self-capacitance detection frequency may also refer to a processing frequency at which the touch control chip calculates the coordinate location of the touch point based on the self-capacitance value of each electrode. The 120 Hz frequency mutual capacitance detection may also mean that after the touchscreen reports the self-capacitance value of each electrode on the touchscreen to the touch control chip, the touch control chip calculates the coordinate location of the touch point based on the self-capacitance value of each electrode at the processing frequency of 120 Hz.

Figure 6:
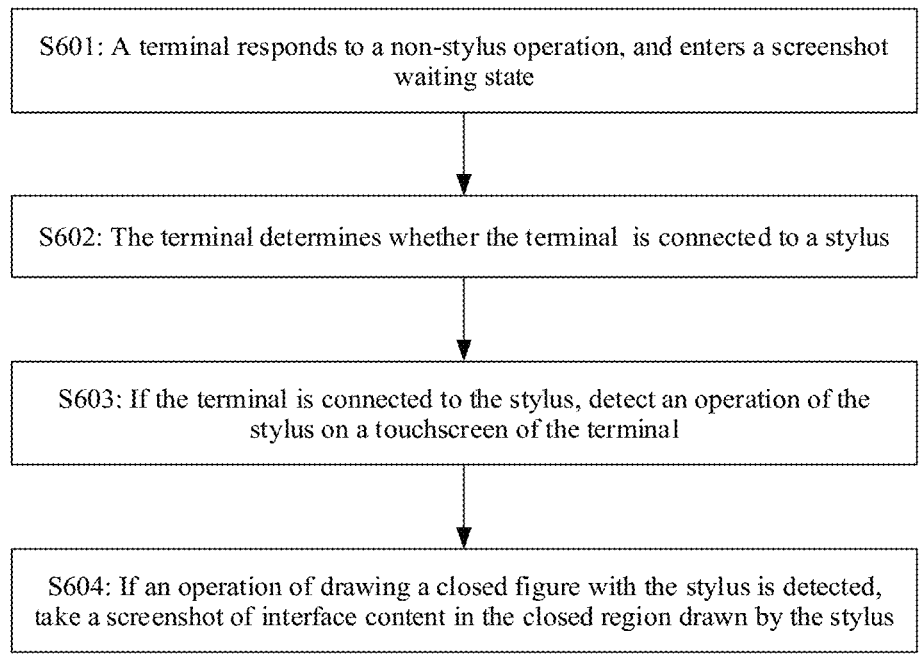
FIG. 6 is a schematic flowchart of a screenshot method according to an embodiment of this application.

FIG. 6 shows a screenshot method according to an embodiment of this application. The method includes but is not limited to the following steps.

Step S601: A terminal responds to a non-stylus operation, and enters a screenshot waiting state.

Further, in this embodiment of this application, the terminal enters the screenshot state without using a stylus. The following uses an example for description.

For example, the terminal responds to a three-finger swipe-down operation input by a user, and enters the screenshot waiting state. To be specific, the user swipes on a touchscreen with three fingers. Optionally, the three-finger swipe-down operation may be performed on any interface when the terminal is in an unlocked state. Correspondingly, the terminal receives the three-finger swipe-down operation input by the user, and responds to the operation, so that the terminal enters the screenshot waiting state. It should be noted that in this embodiment of this application, a corresponding algorithm is preconfigured in the terminal to identify a feature generated when three fingers simultaneously swipe on the touchscreen. Therefore, whether there is the three-finger swipe-down operation can be detected based on the algorithm.

For another example, the terminal responds to a knuckle tap operation input by the user, and enters the screenshot waiting state. That is, the user taps the touchscreen with a knuckle. Optionally, the knuckle tap operation may be performed on any interface when the terminal is in an unlocked state. Correspondingly, the terminal receives the knuckle tap operation input by the user, and responds to the knuckle tap operation, so that the terminal enters the screenshot waiting state. It should be noted that in this embodiment of this application, a corresponding algorithm is preconfigured in the terminal to identify a feature generated when the touchscreen is tapped with a knuckle. Therefore, whether there is the knuckle tap operation can be detected based on the algorithm.

Figure 7:
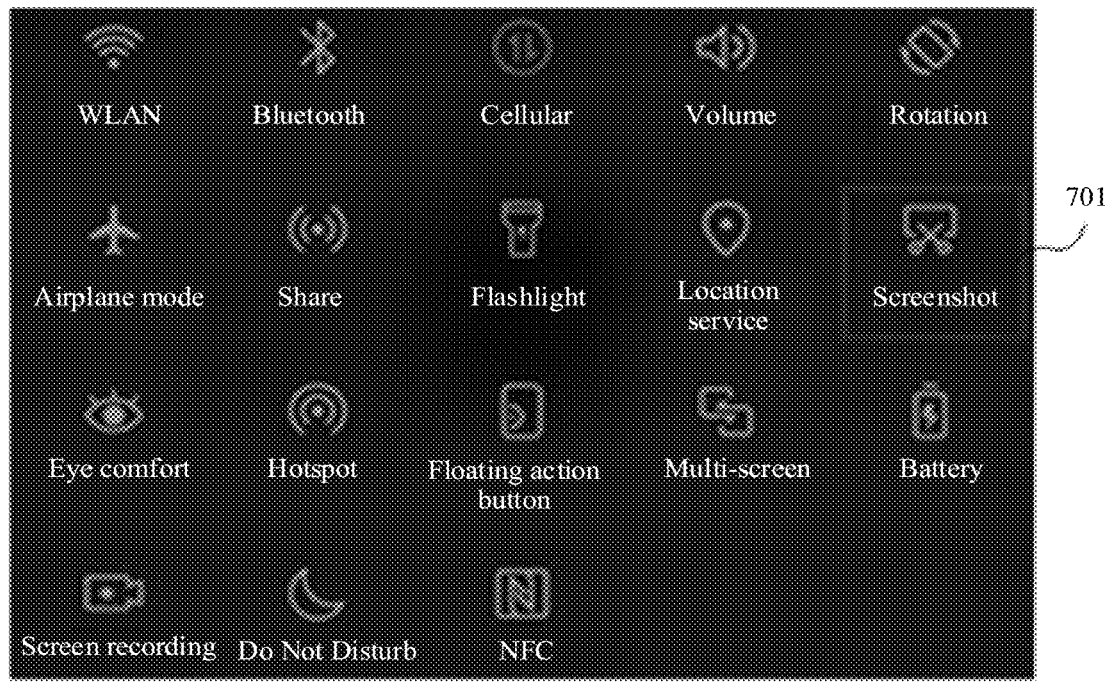
FIG. 7 is a schematic diagram of a scenario of a screenshot button in a drop-down menu according to an embodiment of this application.

For another example, the terminal responds to a touch (for example, tap) operation input by the user on a virtual screenshot button in a drop-down menu, and enters the screenshot waiting state. As shown in FIG. 7, the user taps a virtual screenshot button 701 in a drop-down menu. Optionally, a touch operation on the virtual screenshot button in the drop-down menu may be performed on any interface of the terminal. Correspondingly, the terminal receives the tap operation performed by the user on the virtual screenshot button, and responds to the tap operation, so that the terminal enters the screenshot waiting state. It should be noted that in this embodiment of this application, a corresponding algorithm is preconfigured in the terminal to identify whether the user taps the virtual screenshot button. Therefore, whether there is an operation of taping the virtual screenshot button in the drop-down menu may be detected based on the algorithm.

In this embodiment of this application, the screenshot waiting state is a state in which a screenshot is to be taken but has not been taken. Whether a screenshot is actually taken depends on a further operation of the user on the terminal and/or a status of a connection between the terminal and the stylus.

Step S602: The terminal determines whether the terminal is connected to the stylus.

Further, the terminal and the stylus may be connected through BT, NFC, another wireless connection, or a wired connection. A connection may be established in the following manner.

For example, when a distance between the terminal and the stylus is less than a preset distance, or signal strength between the terminal and the stylus is greater than preset signal strength, the terminal exchanges information with the stylus to automatically establish a connection.

For another example, when detecting a signal from the stylus, the terminal sends information to the stylus to request to establish a connection. Alternatively, when detecting a signal from the terminal, the stylus sends information to the terminal to request to establish a connection.

For another example, the terminal has a physical button or a virtual button (or icon) for triggering connection establishment by the user. When the user taps the physical button or the virtual button on the terminal, the terminal responds, and exchanges information with the stylus to establish a connection.

For another example, the stylus detects a posture of the stylus, and when the posture of the stylus meets a preset feature, the stylus sends information to the terminal to request to establish a connection. The preset feature may be obtained by training posture features of the stylus or performing calculation processing when the user holds the stylus to perform an operation on the touchscreen. Therefore, when the posture of the stylus meets the preset feature, it can be inferred with a high probability that the user is to perform an operation on the touchscreen with the stylus. Therefore, when the posture of the stylus meets the preset feature, requesting to establish a connection may meet a current operation requirement of the user with a high probability.

For another example, the stylus detects an operation performed by the user on the stylus, and when detecting that the user holds the stylus, the stylus sends information to the terminal to request to establish a connection. When the user holds the stylus, it can be inferred with a high probability that the user is to perform an operation on the touchscreen with the stylus. Therefore, in this case, requesting the terminal to establish a connection may meet a current operation requirement of the user with a high probability.

For another example, when the stylus detects that the posture of the stylus meets the preset feature, and detects that the user holds the stylus, the stylus sends information to the terminal to request to establish a connection. With combination of the two conditions, it can be more accurately inferred that the user is to perform an operation on the touchscreen with the stylus. Therefore, in this case, requesting the terminal to establish a connection may meet a current operation requirement of the user with a higher probability.

The foregoing describes a manner in which the terminal establishes a connection to the stylus. Regardless of whether the terminal establishes a connection to the stylus, the terminal can detect this by using recorded information or a current running status of the terminal. For example, for a stylus with BT, the terminal can determine, only by identifying a BT connection of the stylus, that the terminal is connected to the stylus.

Step S603: If the terminal is connected to the stylus, detect an operation of the stylus on the touchscreen of the terminal.

Optionally, if it is determined that the terminal is not connected to the stylus, a conventional screenshot operation may be performed. For example, a screenshot of an entire currently displayed interface is directly taken.

Step S604: If an operation of drawing a closed figure with the stylus is detected, take a screenshot of interface content in the closed region drawn with the stylus.

Optionally, if it is detected on the touchscreen that a plurality of touch points of a modulation signal of a nib of the stylus can be connected to form a closed region whose area is not smaller than a preset threshold, it is considered that the operation of drawing a closed figure with the stylus is detected. Optionally, it is detected that any two touch points that are adjacent in a time sequence in the plurality of touch points of the modulation signal of the nib are connected, and the first touch point in the time sequence and the last touch point in the time sequence are connected, to form a closed region. To be specific, the time sequence herein is a sequence of detecting the modulation signal of the nib. In addition, the connection herein may be a straight line connection, or may be a smooth curve connection. After the connection, smoothing processing or other processing may be performed to obtain a closed region.

Optionally, when a distance between the first touch point in the time sequence and the last touch point in the time sequence described above is excessively far, it is considered that the touch points cannot be connected to obtain a closed figure. Because when the distance between the first touch point and the last touch point of the stylus is excessively far, the user usually does not intend to draw a closed figure. A screenshot taken by this mechanism may make a screenshot result better meet a requirement of the user.

In an optional solution, there is an area requirement for the closed region herein. The area of the closed region is not less than a preset threshold, or a ratio of the area of the closed region to a circumference of the closed region is not less than a preset threshold. This is mainly to avoid a misoperation. Usually, when the user wants to take a screenshot, the user does not draw a large circle but only takes a screenshot of a very small region. Therefore, this case is defined as a misoperation in this application, and a screenshot operation is not performed in this case.

In another optional solution, there is a time limit for detecting the operation of drawing a closed figure with the stylus. For example, if the operation of drawing a closed figure with the stylus is detected within a preset time period after the terminal enters the screenshot waiting state, a screenshot of the interface content in the closed region drawn with the stylus is taken. In other words, a prerequisite for taking a screenshot of the interface content in the closed region drawn with the stylus is that the operation of drawing the closed figure with the stylus occurs within the preset time period. For example, the preset time period may be set to 5 seconds, 10 seconds, or another time length, and a specific setting may be determined with reference to an operation habit of the user. Certainly, a start location of the preset time period may also be set to a moment at which a connection to the stylus is detected.

In another optional solution, when the stylus performs an operation other than drawing a closed figure within the preset time period, the terminal does not perform a screenshot operation. For example, if the stylus performs an operation of drawing a line, the terminal does not take a screenshot, but performs another operation, for example, display a common line on an interface.

In another optional solution, when the stylus performs the operation of drawing a closed figure beyond the preset time period, the terminal does not perform a screenshot operation, but performs another operation or does not perform any operation (this is considered as a misoperation).

In another optional solution, after the terminal enters the screenshot waiting state, if an operation of drawing a closed figure with a finger of the user on the touchscreen is detected, a screenshot of interface content in the closed region drawn with the finger is taken. It should be noted that in this embodiment of this application, a corresponding algorithm is preconfigured in the terminal to identify a feature generated when a finger slides on the touchscreen. Therefore, whether a closed region drawn with the finger can be detected based on the algorithm. Optionally, there is an area requirement for the closed region herein. An area of the closed region is not less than a preset threshold, or a ratio of the area of the closed region to a circumference of the closed region is not less than a preset threshold. This is mainly to avoid a misoperation. Usually, when the user wants to take a screenshot, the user does not draw a large circle but only takes a screenshot of a very small region. Therefore, this case is defined as a misoperation in this application, and a screenshot operation is not performed in this case.

Figure 8:
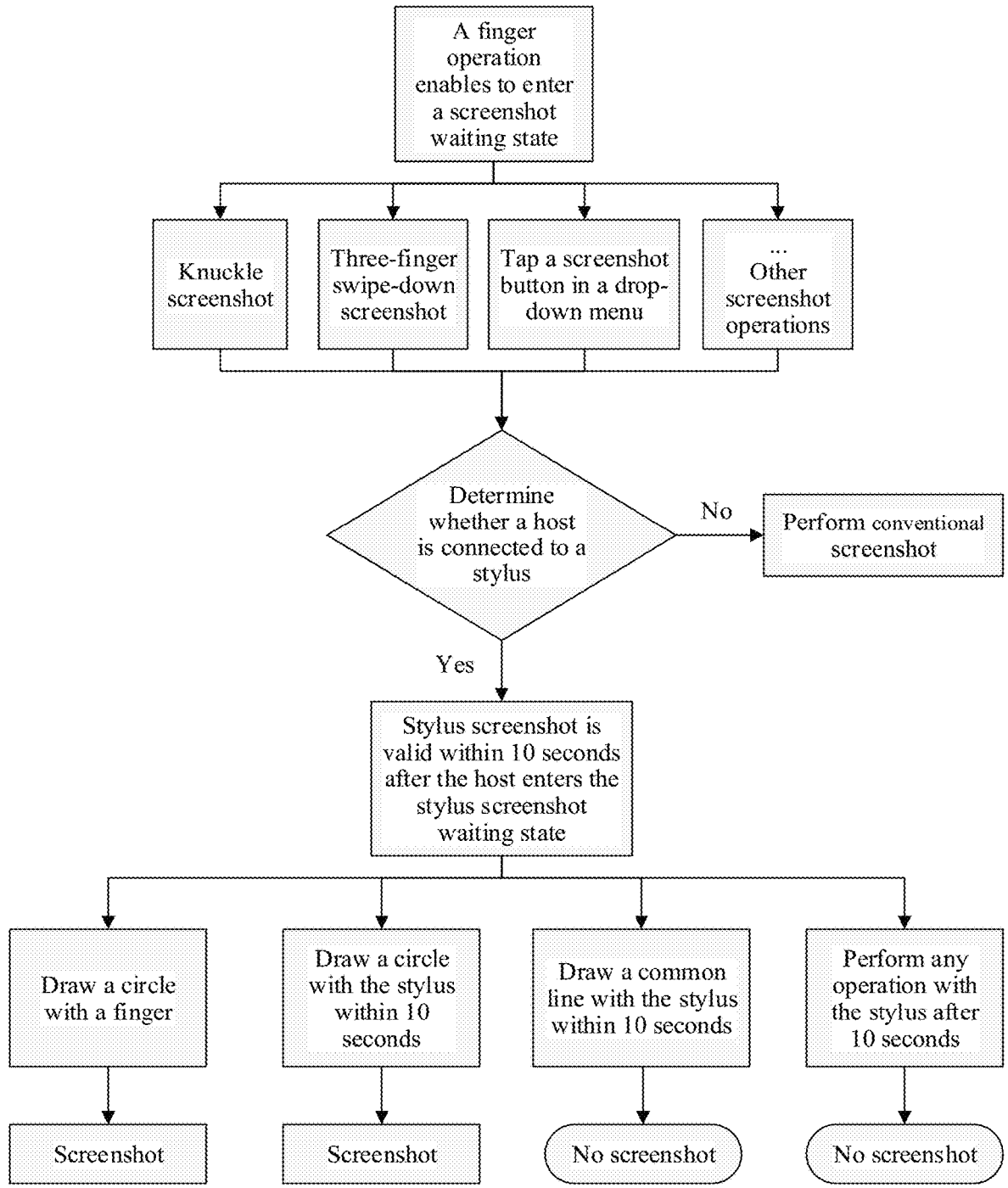
FIG. 8 is a schematic flowchart of a screenshot method according to an embodiment of this application.

FIG. 8 shows optional execution logic of a screenshot method according to an embodiment of this application. The execution logic is obtained by combining some of the foregoing optional solutions.

Figure 9:
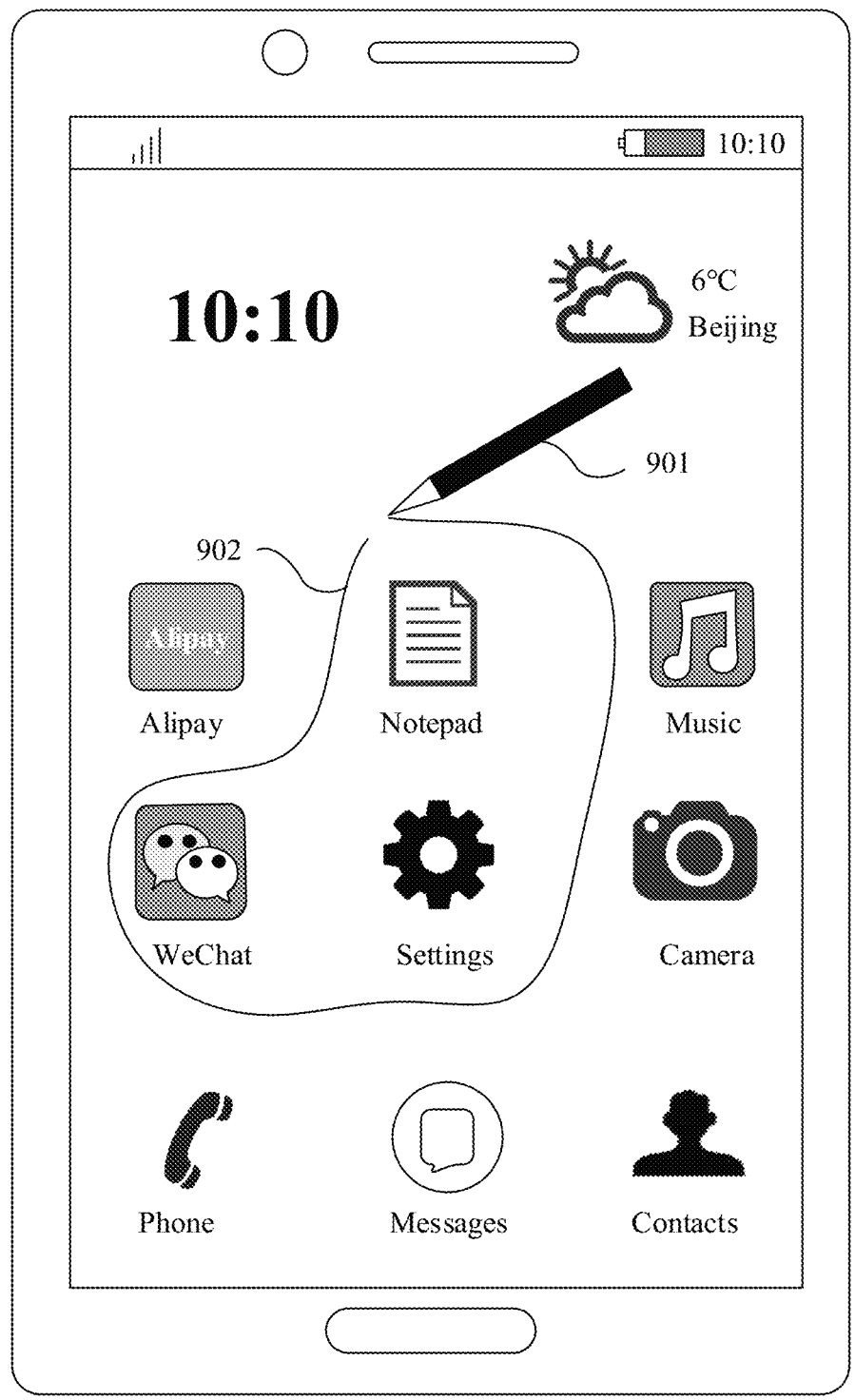
FIG. 9 is a schematic diagram of a screenshot interface according to an embodiment of this application.
Figure 10:
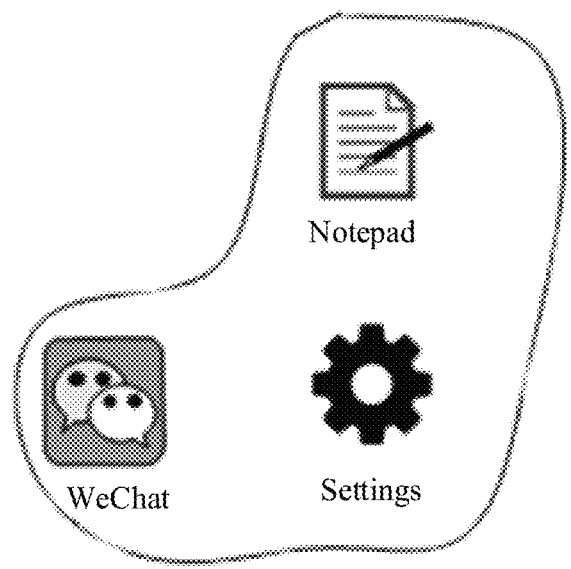
FIG. 10 is a schematic diagram of a screenshot interface according to an embodiment of this application.

FIG. 9 is a schematic diagram of a screenshot scenario according to an embodiment of this application. A user performs an operation of drawing a closed FIG. 902 on a display interface with a stylus 901. Correspondingly, a terminal responds to the operation, takes a screenshot of interface content in the closed region 902, and obtains a screenshot shown in FIG. 10. The obtained screenshot may be in a picture format, for example, a JPEG format or a Graphics Interchange Format (GIF) format. The obtained screenshot may be saved in the terminal.

In the method described in FIG. 6, the terminal enters the screenshot waiting state by non-stylus touching by the user, and detects a stylus operation in the screenshot waiting state. If there is the operation of drawing a closed figure, the terminal takes a screenshot of the interface content in the closed figure. In a screenshot process, a button for enabling to enter the screenshot waiting state does not need to be set on the stylus. Because a button does not need to be set on the stylus, miscontrol in the screenshot process can be avoided, and the stylus is easily and gracefully used like a common pen in real form. In addition, after entering the screenshot waiting state, the terminal may also be compatible with a manner of taking a screenshot by the user with a finger, a knuckle, or the like, so that a conventional screenshot manner is considered.

The foregoing describes in detail the method in embodiments of this application. The following provides apparatuses in embodiments of this application.

Figure 11:
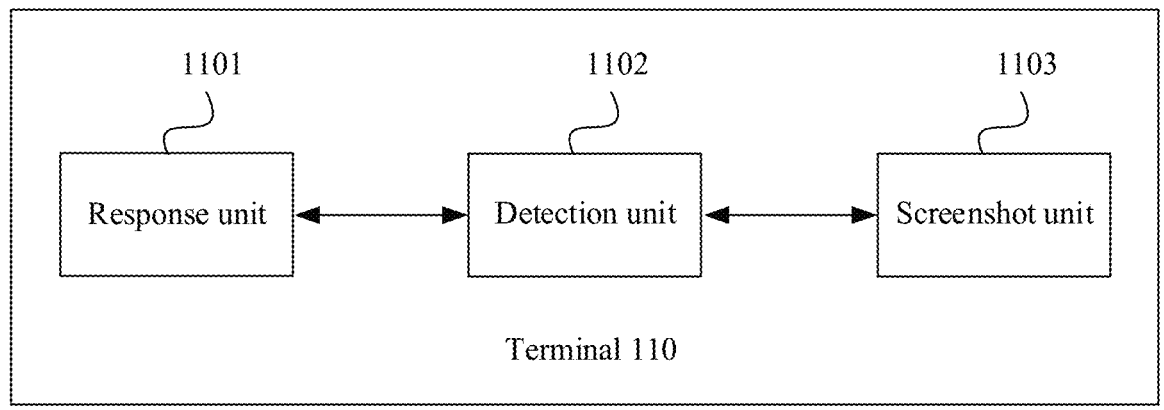
FIG. 11 is a schematic diagram of a structure of a terminal according to an embodiment of this application.

FIG. 11 is a schematic diagram of a structure of a terminal 110 according to an embodiment of this application. The terminal 110 may include a response unit 1101, a detection unit 1102, and a screenshot unit 1103. The units are described in detail as follows.

According to a second aspect, embodiments of this application provide a screenshot terminal. The terminal includes a response unit configured to respond to a non-stylus operation, and enter a screenshot waiting state, a detection unit configured to, when the terminal establishes a connection to the stylus, detect an operation performed with the stylus on a touchscreen of the terminal, and a screenshot unit configured to, when an operation of drawing a closed figure with the stylus is detected, take a screenshot of interface content in the closed region drawn with the stylus.

According to the foregoing method, the terminal enters the screenshot waiting state by non-stylus touching by a user, and detects a stylus operation in the screenshot waiting state. If there is the operation of drawing a closed figure, the terminal takes a screenshot of the interface content in the closed figure. In a screenshot process, a button for enabling to enter the screenshot waiting state does not need to be set on the stylus. Because a button does not need to be set on the stylus, miscontrol in the screenshot process can be avoided, and the stylus is easily and gracefully used like a common pen in real form. In addition, after entering the screenshot waiting state, the terminal may also be compatible with a manner of taking a screenshot by the user with a finger, a knuckle, or the like, so that a conventional screenshot manner is considered.

In a possible solution, when responding to the non-stylus operation, and entering the screenshot waiting state, the response unit is further configured to respond to a three-finger swipe-down operation input by the user, and enter the screenshot waiting state, or respond to a knuckle tap operation input by the user, and enter the screenshot waiting state, or respond to a touch operation input by the user on a virtual screenshot button in a drop-down menu, and enter the screenshot waiting state.

In another possible implementation, in an aspect that the terminal captures, when taking, if the operation of drawing a closed figure with the stylus is detected, a screenshot of the interface content in the closed region drawn with the stylus, the screenshot unit is further configured to, if the operation of drawing a closed figure with the stylus is detected within a preset time period after the terminal enters the screenshot waiting state, take a screenshot of the interface content in the closed region drawn with the stylus. Due to a limitation of the preset time period, even if the user does not draw a closed figure with the stylus to take a screenshot, the terminal does not always stay in the screenshot waiting state and can perform another task. This improves flexibility of the terminal. In addition, this manner can also avoid a misoperation to a greatest extent. For example, the user may misoperate the terminal to enter the screenshot waiting state. Therefore, the user usually does not draw a closed figure with the stylus immediately, but may draw a closed figure with the stylus after a long time period. However, after a long time period, if the operation of drawing a closed figure with the stylus is independently performed, an objective of the operation is usually not to take a screenshot. Therefore, in this application, a screenshot is taken only when the operation of drawing a closed figure with the stylus occurs within the preset time period. If the operation of drawing a closed figure with the stylus is performed after the preset time period, no screenshot is taken. This avoids a misoperation.

In still another possible implementation, in a third possible implementation of the second aspect, the terminal further includes a determining unit, and the determining unit is configured to, before the detection unit detects, when the terminal establishes a connection to the stylus, the operation performed with the stylus on the touchscreen of the terminal, determine whether the terminal establishes a connection to the stylus. It can be understood that the terminal further identifies a related operation of the stylus only when the terminal detects that the terminal establishes a connection to the stylus, instead of performing identification in every case. This can avoid many invalid identifications and reduce calculation overheads.

In still another possible implementation, if it is detected, on the touchscreen, that a plurality of touch points of a modulation signal of a nib of the stylus can be connected to form a closed region whose area is not smaller than a preset threshold, the operation of drawing a closed figure with the stylus is detected. It can be understood that, because the user may directly act on touch points when operating on the touchscreen with the stylus, a connection line of the touch points may reflect an area that the user wants to select. In addition, limiting an area of a closed region is mainly to avoid a misoperation. Usually, when the user wants to take a screenshot, the user does not draw a large circle but only takes a screenshot of a very small region. Therefore, this case is defined as a misoperation in this application, and a screenshot operation is not performed in this case.

In still another possible implementation, the screenshot unit is further configured to, after the terminal enters a screenshot waiting state, if an operation of drawing a closed figure with a finger is detected, take a screenshot of interface content in the closed region drawn with the finger. In addition, after entering the screenshot waiting state, the terminal may also be compatible with a manner of taking a screenshot by the user with a finger, a knuckle, or the like, so that a conventional screenshot manner is considered.

It should be noted that, for implementation of the terminal 110 and beneficial effects thereof, refer to corresponding descriptions in the method embodiment shown in FIG. 6.

Embodiments of this application further provide a chip system. The chip system includes at least one processor, a memory, and an interface circuit. The memory, the transceiver, and the at least one processor are interconnected through a line, and the at least one memory stores a computer program. When the computer program is executed by the processor, the method procedure shown in FIG. 6 is implemented.

Embodiments of this application further provide a computer-readable storage medium. The computer-readable storage medium stores a computer program, and when the computer program is run on a computer, the method procedure shown in FIG. 11 is implemented.

Embodiments of this application further provide a computer program product. When the computer program product is run on a processor of a terminal, the method shown in FIG. 6 is implemented.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method, wherein the method comprises:
   detecting a first non-stylus operation;
   entering, in response to the first non-stylus operation, a screenshot waiting state, wherein the screenshot waiting state enables a user to take a screenshot of a content on a screen;
   detecting, after entering the screenshot waiting state, whether a connection to a stylus has been established;
   taking a first screenshot of first interface content in a first closed figure during the screenshot waiting state, in response to detecting a stylus operation performed with the stylus on a touchscreen of a terminal, and after detecting the connection to the stylus, wherein the stylus operation is of drawing the first closed figure with the stylus; and
   taking a second screenshot during the screenshot waiting state, in response to detecting a second non-stylus operation, and while waiting for the connection to the stylus.

2. The method of claim 1, wherein the first non-stylus operation comprises a three-finger swipe-down operation.

3. The method of claim 1, wherein the first non-stylus operation comprises a knuckle tap operation.

4. The method of claim 1, wherein the first non-stylus operation comprises a touch operation from the user on a virtual screenshot button in a drop-down menu.

5. The method of claim 1, further comprising:
   further taking the first screenshot when the stylus operation is detected within a preset time period after the terminal enters the screenshot waiting state.

6. The method of claim 1, wherein before detecting the first stylus operation, the method further comprises detecting whether the terminal establishes the connection to the stylus.

7. The method of claim 1, further comprising:
   detecting the stylus operation by detecting that touch points of a modulation signal of a nib of the stylus are connected to form the first closed figure; and
   further taking the first screenshot when the first closed figure has an area greater than or equal to a preset threshold.

8. The method of claim 1, wherein after responding to the first non-stylus operation by entering the screenshot waiting state, the method further comprises:
   detecting a third operation of drawing a second closed figure with a finger; and
   taking, in response to the third operation, a third screenshot of second interface content in the second closed figure.

9. A terminal comprising:
   a touchscreen; and
   a processor coupled to the touchscreen and configured to:
      detect a first non-stylus operation;
      enter in response to the first non-stylus operation, a screenshot waiting state, wherein the screenshot waiting state enables a user to take a screenshot of a content on a screen;
      detect, after entering the screenshot waiting state, whether a connection to a stylus has been established;
      take a first screenshot of first interface content in a first closed figure during the screenshot waiting state, in response to detecting a stylus operation performed with the stylus on the touchscreen, and after detecting the connection to the stylus; and
      take a second screen during the screenshot waiting state, in response to detecting a second non-stylus operation, and while waiting for the connection to the stylus.

10. The terminal of claim 9, wherein the first non-stylus operation comprises:
   a three-finger swipe-down operation;
   a knuckle tap operation; or
   a touch operation from the user on a virtual screenshot button in a drop-down menu.

11. The terminal of claim 9, wherein the processor is further configured to
   further take the first screenshot when the stylus operation is detected within a preset time period after the terminal enters the screenshot waiting state.

12. The terminal of claim 9, wherein before detecting the stylus operation, the processor is further configured to detect whether the terminal establishes the connection.

13. The terminal of claim 9, wherein the processor is further configured to:
   detect the stylus operation by detecting that touch points of a modulation signal of a nib of the stylus are connected to form the first closed figure; and
   further take the first screenshot when the first closed figure has an area greater than or equal to a preset threshold.

14. The terminal of claim 9, wherein the processor is further configured to:
- detect a third operation of drawing a second closed figure with a finger; and
- take, in response to the third operation, a second screenshot of second interface content in the second closed figure.

15. A computer program product comprising computer-executable instructions that are stored on a non-transitory computer-readable medium and that, when executed by a processor, cause a terminal to:
- detect a first non-stylus operation;
- enter, in response to detecting the first non-stylus operation, a screenshot waiting state, wherein the screenshot waiting state enables a user to take a screenshot of a content on a screen;
- detect, after entering the screenshot waiting state, whether a connection to a stylus has been established;
- take a first screenshot of first interface content in a first closed figure during the screenshot waiting state, in response to detecting a stylus operation performed with the stylus on a touchscreen, and after detecting the connection to the stylus; and
- take a second screenshot during the screenshot waiting state, in response to detecting a second non-stylus operation, and while waiting for the connection to the stylus.

16. The computer program product of claim 15, wherein the first non-stylus operation comprises:
- a three-finger swipe-down operation;
- a knuckle tap operation; or
- a touch operation from the user on a virtual screenshot button in a drop-down menu.

17. The computer program product of claim 15, wherein the computer-executable instructions further cause the terminal to:
- further take the first screenshot when the stylus operation is detected within a preset time period after the terminal enters the screenshot waiting state.

18. The computer program product of claim 15, wherein before detecting the stylus operation, the computer-executable instructions further cause the terminal to detect whether the terminal establishes the connection.

19. The computer program product of claim 15, wherein the computer-executable instructions further cause the terminal to:
- detect the stylus operation by detecting that touch points of a modulation signal of a nib of the stylus are connected to form the first closed figure; and
- further take the first screenshot when the first closed figure has an area greater than or equal to a preset threshold.

20. The computer program product of claim 15, wherein the computer-executable instructions further cause the terminal to:
- detect a third operation of drawing a second closed figure with a finger; and
- take, in response to the third operation, a third screenshot of second interface content in the second closed figure.

* * * * *

UNITED STATES PATENT AND TRADEMARK OFFICE
CERTIFICATE OF CORRECTION

PATENT NO. : 12,204,741 B2  
APPLICATION NO. : 17/848915  
DATED : January 21, 2025  
INVENTOR(S) : Tao Zheng et al.

Page 1 of 1

It is certified that error appears in the above-identified patent and that said Letters Patent is hereby corrected as shown below:

In the Claims

Claim 5, Column 28, Line 4: "further comprising:" should read "further comprising"

Claim 6, Column 28, Line 9: "first stylus operation" should read "stylus operation"

Claim 17, Column 30, Line 6: "to:" should read "to"

Signed and Sealed this  
Eighteenth Day of March, 2025

Coke Morgan Stewart  
*Acting Director of the United States Patent and Trademark Office*